(12) United States Patent
Armstrong et al.

(10) Patent No.: US 10,114,231 B1
(45) Date of Patent: Oct. 30, 2018

(54) EYEWEAR WITH DETACHABLE TEMPLES

(71) Applicants: Eric William Armstrong, Ridgefield, WA (US); Riley Stewart Bingham, Oakland, CA (US)

(72) Inventors: Eric William Armstrong, Ridgefield, WA (US); Riley Stewart Bingham, Oakland, CA (US)

( * ) Notice: Subject to any disclaimer, the term of this patent is extended or adjusted under 35 U.S.C. 154(b) by 122 days.

(21) Appl. No.: 15/081,887

(22) Filed: Mar. 27, 2016

Related U.S. Application Data

(60) Provisional application No. 62/138,978, filed on Mar. 27, 2015.

(51) Int. Cl.
| | |
|---|---|
| *G02C 5/22* | (2006.01) |
| *E05D 5/12* | (2006.01) |
| *E05D 7/10* | (2006.01) |
| *G02C 5/14* | (2006.01) |
| *E05D 5/10* | (2006.01) |

(52) U.S. Cl.
CPC .............. *G02C 5/2209* (2013.01); *E05D 5/12* (2013.01); *E05D 7/1011* (2013.01); *G02C 5/146* (2013.01); *E05D 2005/108* (2013.01); *E05D 2007/1027* (2013.01); *G02C 2200/08* (2013.01); *G02C 2200/26* (2013.01)

(58) Field of Classification Search
CPC ...... G02C 5/2209; G02C 5/22; G02C 5/2218; G02C 5/2227; G02C 5/2236; G02C 5/2245; G02C 5/2254; G02C 5/2263; G02C 5/2272; G02C 5/2281; G02C 5/229; E05D 2005/102; E05D 5/10; E05D 5/02; E05D 7/1005; E05D 7/02; E05D 7/1022; E05D 7/1011; E05D 7/1016; E05D 2007/1027; E05D 15/50; E05D 15/502; E05D 15/507; F25D 2323/022; H01R 13/17
See application file for complete search history.

(56) References Cited

U.S. PATENT DOCUMENTS

| | | | | |
|---|---|---|---|---|
| 4,084,889 A | * | 4/1978 | Vischer, Jr. .......... | G02C 5/2209 16/228 |
| 4,564,308 A | * | 1/1986 | Ikegami ................... | A44C 5/14 224/164 |
| 4,974,289 A | * | 12/1990 | Piard ..................... | E05D 11/105 16/228 |
| 5,483,505 A | * | 1/1996 | Cartier ............... | G04B 37/1493 224/164 |
| 6,076,926 A | * | 6/2000 | Kostka ................... | G02C 3/003 351/113 |
| 2014/0101893 A1 | * | 4/2014 | Dornhege .......... | G04B 37/1493 24/3.2 |

FOREIGN PATENT DOCUMENTS

| | | | | |
|---|---|---|---|---|
| DE | 3414641 A1 | * | 10/1985 | ............. G02C 5/008 |
| EP | 179462 A2 | * | 4/1986 | |
| JP | 2011232721 A | * | 11/2011 | |

* cited by examiner

*Primary Examiner* — Daniel J Colilla

(57) ABSTRACT

An eyewear with detachable temples includes a front frame, a detachable hinge, and temples extending rearwardly from opposing sides of the front frame. The detachable hinge includes a receiving mount attached to opposing sides of the front frame, a pin housing attached to the temples, and a pin within the pin housing that can be removably connected to the receiving mounts.

8 Claims, 4 Drawing Sheets

EYEWEAR WITH DETACHABLE TEMPLES

CROSS-REFERENCE TO RELATED APPLICATIONS

This application claims the benefit of U.S. Provisional Patent Application No. 62/138,978, filed Mar. 27, 2015 the contents of which are herein incorporated by reference in their entireties.

FIELD OF TECHNOLOGY

This disclosure relates generally to the field of eyewear and more specifically to eyewear having detachable temples.

BACKGROUND

Eyeglasses typically comprise a front frame for holding a lens and a hinge connecting temples to both sides of the front frame, the temples extending rearwardly over the ears of a user. The temples (also called side pieces, arms or ear stems) of eyeglasses are commonly attached to the frame by an interlocking hinge piece on the temple and frame. The interlocking hinge pieces are held in place by a screw that is inserted through holes in the hinge and serve as a hinge pin. There are many known problems with the interlocking hinge of conventional eyewear including that the threads in which the screw attaches may become stripped or the hinge screw may loosen and fall out. Furthermore, the temples cannot be easily removed from the front frame because of the conventional hinge.

Today, eyeglasses are worn for a wide range of purposes. They can be worn to correct for deficiencies in eyesight, tinted to reduce eye fatigue from the sun, or worn as a fashion accessory. The many needs a of user result in the need to buy, store, and maintain a number of eyeglasses. The cost, storage, and maintenance requirements to maintain the desired range of eyeglasses may become prohibitive.

What is needed is an eyewear which provides a method of quickly and easily changing the appearance or function of the eyewear.

SUMMARY OF THE INVENTION

It is therefore an object of the invention to provide an eyewear having a detachable hinge that allows the temples to be quickly and easily removed from the front frame of the eyewear.

To this end, the invention proposes an eyewear that comprises a front frame with a temple extending rearwardly from both sides of the frame. The temple is attached to the front frame by a detachable hinge that comprises a pin, a pin housing, and a receiving mount.

In one embodiment, an eyewear includes a front frame having a receiving mount on a left side and a right side of the front frame. A pair of temples are connectable to the receiving mount on the left side and the right side of the front frame and each temple of the pair of temples has a pin housing. A pin within the pin housing that can be removably connected to the receiving mount on the left side and the right side of the front frame.

In another embodiment, an eyewear includes a front frame with a receiving mount on opposing sides of the front frame, the receiving mount having an upper arm with an aperture and a lower arm with an aperture. The eyewear also includes a pair of temples each having a pin housing, the pin housing having a hollow cylindrical member with an open upper end, an open lower end, and an orifice that extends downwardly from the open upper end towards the lower end of the cylindrical member. A pin is removably positioned within the hollow cylindrical member of the pin house and has a hollow cylindrical outer member that is open at a upper end and a lower end and an inner member within the outer member that has an upper head extending from the upper end of the outer member and a lower head extending from the lower end of the outer member, the upper head and lower head of the inner member connected to each other by a coil spring. A knob can be attached to the upper head of the inner member of the pin that extends through an aperture on the outer member of the pin and the orifice of the pin housing. The receiving mount and the pin housing can be pivotably connected by applying pressure to the knob to retract the upper head of the pin and inserting the lower head of the pin within the aperture on the lower arm of the receiving mount and removing the pressure on the knob to spring the upper head of the pin into the aperture on the upper arm of the receiving mount.

In yet another embodiment, a detachable hinge for an eyewear includes a receiving mount having an upper arm with an aperture and a lower arm with an aperture. A pin housing has a hollow cylindrical member with an open upper end and an open lower end and an orifice that extends downwardly from the open upper end towards the lower end of the cylindrical member. A pin is removably positioned within the hollow cylindrical member of the pin housing and has a hollow cylindrical outer member that is open at a upper end and a lower end and an inner member within the outer member having an upper head that extends from the upper end of the outer member and a lower head that extends from the lower end of the outer member, the upper head and lower head of the inner member connected to each other by a coil spring. A knob is attached to the upper head of the inner member of the pin and extends through an aperture on the outer member of the pin and the orifice of the pin housing. The receiving mount and the pin housing can be pivotably connected by applying pressure to the knob to retract the upper head of the pin and inserting the lower head of the pin within the aperture on the lower arm of the receiving mount and removing the pressure on the knob to spring the upper head of the pin into the aperture on the upper arm of the receiving mount.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed is an apparatus for an eyewear with detachable temples. Although the present embodiments have been described with reference to specific example embodiments, it will be evident that various modifications and changes may be made to these embodiments without departing from the broader spirit and scope of the various embodiments.

Figure 1:
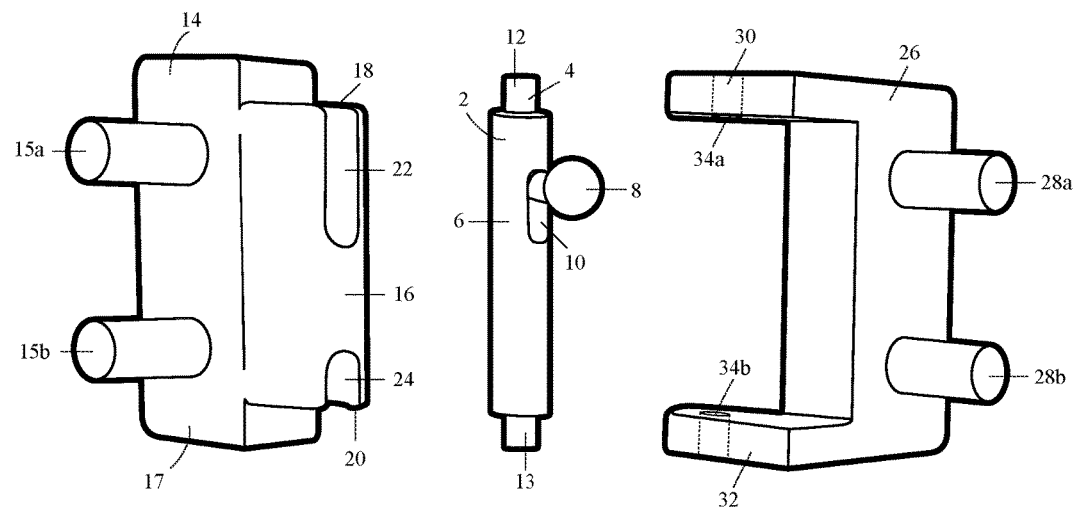
FIG. 1 is an exploded perspective view of a detachable hinge, according to one embodiment.

As shown in FIG. 1, a detachable hinge is comprised of a pin 2, a pin housing 14, and a receiving mount 26. The pin 2 is comprised of two tubular members, an interior member 4 and an outer member 6. The outer member 6 is hollow and open at both ends and the interior member 4 is fitted within the hollow tube of the outer member 6 and can move within the outer member 6. The interior member 4 has an upper head 12, a lower head 13, and a coil spring that connects the upper head 12 and lower head 13 together, making the pin 2 spring loaded. The upper head 12 and the lower head 13 extend from the open ends of the outer member 6 and can be retracted into the outer member 6 of the pin 2 independently of each other by applying pressure to the heads. A knob 8 may be attached to the upper head 12 of the interior member 4 and extend through an aperture 10 in the outer member 6. When pressure is applied to the knob 8 the knob can move downwardly and the coil spring of the interior member 4 is depressed. The coil spring will immediately spring back when pressure is removed from the knob 8 causing the upper head 12 of the interior member 4 to spring back to its original position. The knob 8 may be moved within the aperture 10 to retract the upper head 12 of the interior member 4 manually by a user. Although not shown, a knob could also be attached to the lower head of the interior member 4. Alternatively, the knob 8 may be moved downward when pressure is applied and then remain in a locked downward position until pressure is applied in the opposite direction. The knob 8 may be any size or shape that would allow a user to apply the necessary pressure to retract the upper head 12 of the interior member 4. The aperture 10 is sized appropriately to allow the knob 8 to be moved the necessary distance to retract the upper head 12 of the interior member 4. Both the upper head 12 and the lower head 13 of the interior member 4 may also be retracted by applying pressure to the upper or lower heads themselves and spring back to an extended position when pressure is removed. Alternatively, the knob may be capable of retracting both the upper head 12 and lower head 13 of the interior member 4 through a singular movement of the knob.

Figure 4:
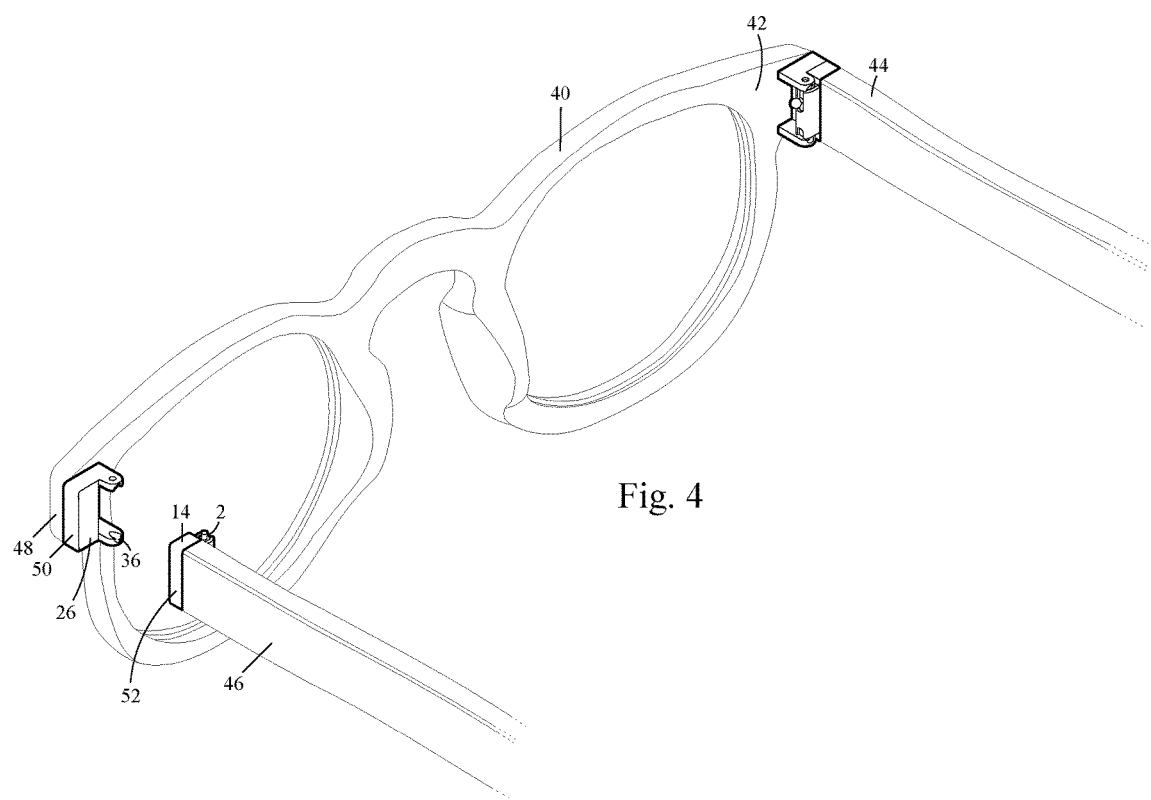
FIG. 4 is a perspective view of an eyewear having a front frame with a temple attached by the detachable hinge and a temple removed, according to one embodiment

The pin 2 can slide into and be held in place by a pin housing 14. The pin housing 14 is attached to the interior end 52 of the eyewear temple, as shown in FIG. 4. The pin housing 14 may be attached to the temple with adhesive, screws, or any other attachment means known in the art. As shown in FIG. 1, the pin housing has two attachment rods 15a, 15b that extend from a main body 17 of the pin housing 14. The attachment rods can be adhered in two correspondingly sized apertures on the interior end of the temple to attach the pin housing 14 to the temple. Alternatively, the pin housing 14 may be intrinsic to the temple and be machined directly into the interior end of the temple.

Figure 2:
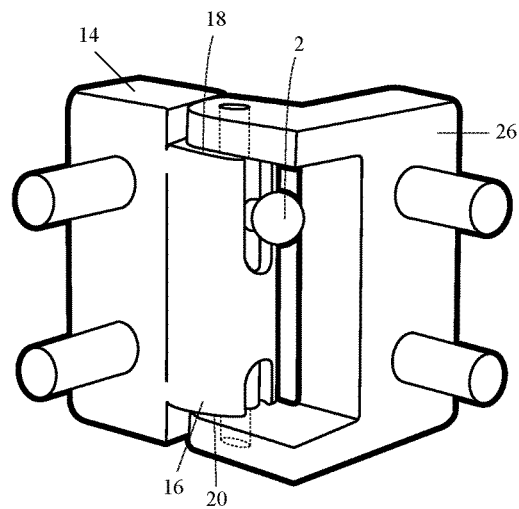
FIG. 2 is a perspective view of a detachable hinge, according to one embodiment.

The pin housing 14 has the main body 17 and a holding portion 16 that is generally a hollow cylindrical member shaped and sized to fit the pin 2 vertically within the holding portion 16, as shown in FIG. 2. The holding portion 16 has a top end 18 and a bottom end 20 that are indented from the top and bottom ends of the main body to allow the receiving mount to be approximately flush with the main body of the pin housing 14 when connected, as shown in FIG. 2. The holding portion 16 is open at the top end 18 and the bottom end 20 to allow the pin 2 to be slid into the top end of the holding portion 16 and protrude from both the top end 18 and the bottom end 20 of the holding portion 16. An upper orifice 22 extends downwardly from the open top end 18 of the holding portion 16 towards the bottom end of the holding portion but ending before the bottom end. The upper orifice 22 allows the knob 8 of the pin 2 to protrude from the upper orifice 22 and allow an eyewear user to move the knob 8 as necessary. A lower orifice 24 may extend upwardly from the bottom end 20 of the holding portion 16 towards the upper orifice 18 but ending before the upper orifice 22. The lower orifice 24 may allow a user to view the pin 2 and make removal of the temple from the front frame easier.

The receiving mount 26 is attached to the front frame. It may be attached to the side wall or the posterior side of the front frame 40. As shown in FIG. 4, the receiving mount is attached on the posterior side 42 of the front frame at the position where the temple pieces will extend rearwardly from the front frame. The receiving mount 26 may be attached to the front frame with adhesive, screws, or any other attachment means known in the art. As shown in FIG. 1, the receiving mount 26 has two attachment rods 28a, 28b that extend from the receiving mount. The attachment rods can be adhered in two correspondingly sized apertures on the front frame to attach the receiving mount 26 to the front frame. Alternatively, the receiving mount 26 may be intrinsic to the front frame and be machined directly into the receiving mount 26.

Figure 3:
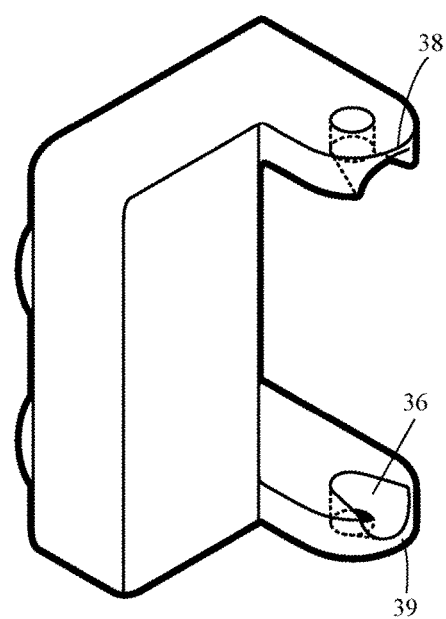
FIG. 3 is a perspective view of a receiving mount of the detachable hinge, according to one embodiment.

The receiving mount 26 has an upper arm 30 and a lower arm 32, each arm with an aperture 34a, 34b sized to receive the upper head 12 and lower head 13 of the interior member 4, respectively. As shown in FIG. 3, a groove 36 may extend from a back end 38 of the upper arm 30 to the aperture 34a and from the back end 39 of the lower arm 32 to aperture 34b. The groove 36 may be deeper at the back end 38, 39 and get gradually narrower towards the apertures 34a, 34b. The groove 36 allows the pin 2 to be more easily moved into the apertures 34a, 34b by pushing the pin 2 through the groove 36 starting at the back end of the arm and gradually retracting the upper head 12 and the lower head 13 of the interior member 4 until the upper head 12 and the lower head 12 reach apertures 34a, 34b and engage with the apertures, locking the upper head 12 and lower head 13 in place. Alternatively, the upper arm 30 and lower arm 32 have a uniform width and do not have a groove. In this case, the upper end 12 and lower end 13 of the interior member 4 need to be manually retracted by using pressure or the knob 8 in order to insert the pin 2 into the apertures 34a, 34b of the receiving mount 26. The interior member 4 may be in a fully extended position when within the apertures 34a, 34b of the receiving mount 26. The pin 2 is able to rotate within the apertures 34a, 34b, creating the hinge motion of the temples to the front frame.

The pin 2, pin housing 14, and receiving mount 26 can be made out of any material that is capable of being molded or machined, including but not limited to plastic, metal, or an alloy.

FIG. 4 shows the detachable hinge attached to an eyewear. The eyewear includes a front frame 40, a detachable hinge, and a pair of temples 44, 46. Temple 44 is attached to the front frame 40 by the detachable hinge and temple 46 is disconnected from the front frame 40 at the detachable hinge. The receiving mount 26 is attached to a posterior side 42 of the front frame 40. Generally, the side wall 48 of the front frame 40 and the side wall 50 of the receiving mount 26 are lined up evenly with each other. The pin housing 14 is attached to the temple 46 at the interior side 52 of the temple 46. The pin 2 is within the holding portion of the pin housing 14. The temple 46 can be removably connected to the front frame 40 by applying pressure to retract the upper head and lower head of the pin 2 and moving the holding portion 16 between the upper arm and lower arm of the receiving mount 26 until the upper head and lower head of the pin 2 engage with the apertures on the receiving mount 26. The pressure to retract the upper head and lower head of the pin 2 can be applied manually by a user or by the groove 36 in the receiving mount 26. The groove 36 will gradually retract the upper head and lower head of the pin 2 until the heads of the pin engage with the apertures on the receiving mount 26 and the holding portion of the pin housing 14 is between the upper arm and lower arm of the receiving mount 26.

If a user desires to remove or exchange the temple 46 from the front frame 40 this can be accomplished using the detachable hinge. The temple 46 can be removed from the front frame when the temple 46 is in a generally perpendicular position to the front frame 40. A user may apply pressure to the knob of the pin 2 to release the upper head of the pin 2 from the aperture in the upper arm of the receiving mount 26. The temple 46 can be moved backwardly and downwardly to pull the upper head from the upper arm of the receiving mount 26. The lower head of the pin 2 can then be released from the aperture in the lower arm of the receiving mount 26 and the temple 46 can be further pulled backwardly to release the holding portion of the pin housing 14 from the receiving mount 26. The pin 2 and the pin housing 14 will remain connected and attached to the removed temple 46. Once removed, the pin 2 may be removed from the pin housing 14 for storage or inserted into a pin housing 14 attached to a different temple for reattachment to the front frame 40.

Figure 5:
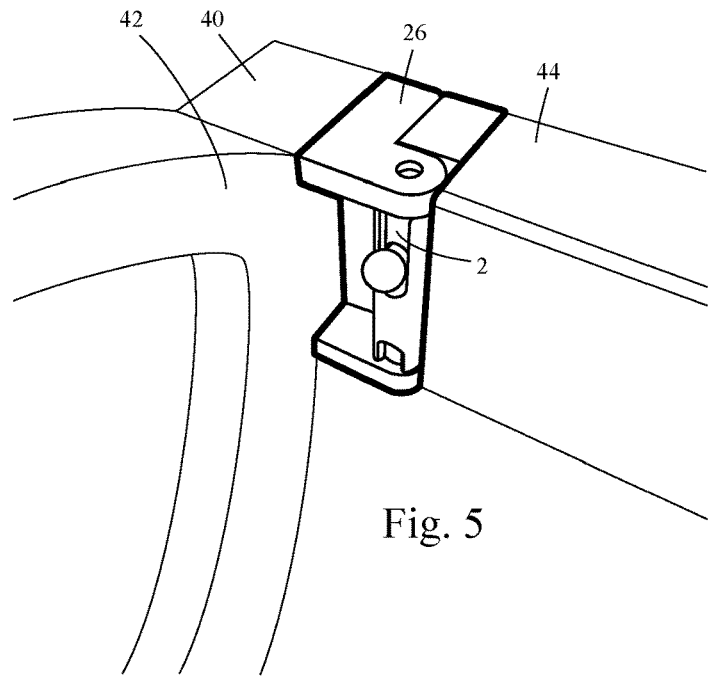
FIG. 5 is a perspective view of a detachable hinge attached to an eyewear, according to one embodiment.
Figure 6:
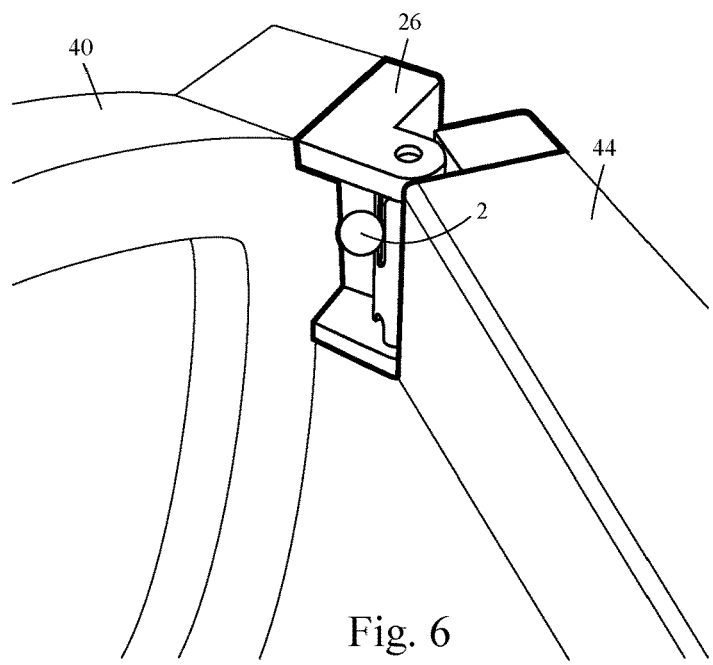
FIG. 6 is a perspective view of a detachable hinge attached to an eyewear, according to one embodiment.

As shown in FIGS. 5 and 6, the pin 2 creates a pivot axis and is able to rotate or pivot within the apertures of the receiving mount 26, creating the eyewear hinge. When the eyewear is worn by a user the temple 44 extends rearwardly from the front frame 40 in a generally perpendicular position. For storage the temple 44 can be rotated to a position adjacent to the front frame 40 about the pivot axis. In the use configuration, when the temple is generally perpendicular to the front frame, a user has access to the knob 8 of the pin 2, however when in a folded configuration the knob 8 is not accessible to a user.

In an alternative embodiment the pin 2 and the pin housing 14 are combined into a single unit attached to a temple that is capable of being inserted in and removed from the receiving mount 26.

Although the present embodiments have been described with reference to specific example embodiments, it will be evident that various modifications and changes may be made to these embodiments without departing from the broader spirit and scope of the various embodiments.

Accordingly, the specification and drawings are to be regarded in an illustrative rather than a restrictive sense.

What is claimed is:
1. An eyewear comprising:
  a front frame with a receiving mount on opposing sides of the front frame, the receiving mount having an upper arm with an aperture and a lower arm with an aperture;
  a pair of temples each having a pin housing, the pin housing having a hollow cylindrical member with an open upper end and an open lower end and an orifice that extends downwardly from the open upper end towards the lower end of the cylindrical member;
  a pin with a hollow cylindrical outer member that is open at a upper end and a lower end and an inner member within the outer member having an upper head that extends from the upper end of the outer member and a lower head that extends from the lower end of the outer member, the upper head and lower head of the inner member connected to each other by a coil spring, the pin removably positioned within the hollow cylindrical member of the pin housing; and
  a knob attached to the upper head of the inner member of the pin that extends through an aperture on the outer member of the pin and the orifice of the pin housing, wherein the receiving mount and the pin housing can be pivotably connected by applying pressure to the knob to retract the upper head of the pin and inserting the lower head of the pin within the aperture on the lower arm of the receiving mount and removing the pressure on the knob to spring the upper head of the pin into the aperture on the upper arm of the receiving mount, the apertures correspondingly sized to accept the upper and lower heads of the pin.

2. An eyewear comprising:
  a front frame having a receiving mount on a left side and a right side of the front frame;
  a pair of temples connectable to the receiving mount on the left side and the right side of the front frame, each temple of the pair of temples having a pin housing;
  a pin having a hollow cylindrical outer member that is open at an upper end and a lower end and an inner member within the outer member having an upper head that extends from the upper end of the outer member and a lower head that extends from the lower end of the outer member, the upper head and lower head of the inner member connected to each other by a coil spring, the pin within the pin housing and removably connected to the receiving mount on the left side and the right side of the front frame; and
  a knob attached to the upper head of the inner member of the pin that extends through an aperture on the outer member of the pin.

3. The eyewear of claim 2, wherein the pin housing has a hollow cylindrical member having an open upper end and an orifice that extends downwardly from the open upper end and ends before a lower end of the cylindrical member, the knob of the inner member of the pin extending through the orifice.

4. The eyewear of claim 3, wherein the pin can be removed from the pin housing.

5. The eyewear of claim 4, wherein the aperture in the pin housing does not extend to the open upper end of the cylindrical member or the open lower end of the cylindrical member.

6. The eyewear of claim 4, wherein the aperture in the pin housing extends downwardly from the open upper end of the cylindrical member towards the lower end of the cylindrical member.

7. The eyewear of claim 2, wherein the pin is fixed within the pin housing.

8. An eyewear comprising:
  a front frame with a receiving mount on opposing sides of the front frame, the receiving mount having an upper arm with an aperture and a lower arm with an aperture;

a pair of temples each having a pin housing, the pin housing having a hollow cylindrical member with an open upper end and an open lower end and an aperture;

a pin with a hollow cylindrical outer member that is open at an upper end and a lower end and an inner member within the outer member, the inner member having an upper head that extends from the upper end of the outer member and a lower head that extends from the lower end of the outer member; and a knob attached to the upper head of the inner member of the pin that extends through an aperture on the outer member of the pin and the aperture of the pin housing, wherein the receiving mount and the pin housing can be pivotably connected by applying pressure to the knob to retract the upper head of the inner member of the pin and inserting the lower head of the inner member of the pin within the aperture on the lower arm of the receiving mount and inserting the upper head of the inner member of the pin within the aperture of the upper arm of the receiving mount.

\* \* \* \* \*